United States Patent [19]

Pennese et al.

[11] Patent Number: 5,788,602
[45] Date of Patent: Aug. 4, 1998

[54] ELECTRONIC ENGINE-CONTROL DEVICE

[75] Inventors: Michele Pennese, Medicina; Savino Lupo, Bologna, both of Italy

[73] Assignee: Magneti Marelli S.p.A., Milan, Italy

[21] Appl. No.: 723,269

[22] Filed: Sep. 30, 1996

[30] Foreign Application Priority Data

Oct. 3, 1995 [IT] Italy ............. TO95 A 000792

[51] Int. Cl.$^6$ ............................................. B60K 41/06
[52] U.S. Cl. ................. 477/107; 477/101; 477/110
[58] Field of Search .................. 477/101, 111, 477/110, 109, 107

[56] References Cited

U.S. PATENT DOCUMENTS

| | | | |
|---|---|---|---|
| 4,355,550 | 10/1982 | Will et al. | 477/107 |
| 4,403,527 | 9/1983 | Mohl et al. | 477/110 |
| 4,593,580 | 6/1986 | Schulze | 477/110 |
| 4,703,428 | 10/1987 | Hosaka et al. | 477/101 |
| 4,945,481 | 7/1990 | Iwatsuki | 364/424.1 |
| 5,036,728 | 8/1991 | Kawasoe et al. | 477/107 |
| 5,048,372 | 9/1991 | Sodeno et al. | 477/111 |
| 5,184,527 | 2/1993 | Nakamura | 477/110 |
| 5,383,824 | 1/1995 | Runge et al. | 477/110 |
| 5,476,425 | 12/1995 | Shiraishi | 477/109 |
| 5,582,558 | 12/1996 | Palmeri et al. | 477/111 |

FOREIGN PATENT DOCUMENTS

| | | |
|---|---|---|
| 0228899 | 7/1987 | European Pat. Off. |
| 0390423 | 10/1990 | European Pat. Off. |
| 0490627 | 6/1992 | European Pat. Off. |
| 0559342 | 9/1993 | European Pat. Off. |
| 0695665 | 2/1996 | European Pat. Off. |
| 4037092 | 5/1992 | Germany |

*Primary Examiner*—Charles A. Marmor
*Assistant Examiner*—Sherry Lynn Estremsky
*Attorney, Agent, or Firm*—Baker & Daniels

[57] ABSTRACT

Engine-control device, in which an internal combustion engine coupled to a transmission group is controlled by a central electronic unit which receives at an input a plurality of information parameters measured in the engine and calculates control signals for operating groups of the engine itself. The device comprises an external processing unit communicating with a control circuit of the transmission group and with the central control unit. The processing unit is capable of being activated by commands originating from the control circuit to modify the control signals, regulating alternately the torque generated by the engine and the speed of rotation of the engine itself.

25 Claims, 3 Drawing Sheets

1

ELECTRONIC ENGINE-CONTROL DEVICE

BACKGROUND OF THE INVENTION

The present invention relates to an electronic engine-control device.

Endothermic engines for vehicles, in particular motor vehicles, are known, coupled to a central electronic control unit which receives in input a plurality of information parameters measured on the vehicle (for example number of engine revolutions, temperature of air taken into the engine, accelerator position, state of a lambda probe, etc.) and generates in output control signals for operating groups (for example an injection system and/or a feed system) of the engine itself.

Also known are transmission groups of automated type comprising a clutch and a gearbox coupled to first and second actuating groups (for example pneumatic actuators) which are capable respectively of carrying out the opening/closing of the clutch and the selection and the engagement of the gears. Such automated transmission groups interact with an electronic control circuit which receives in input a plurality of information signals measured on the vehicle (for example a signal of manual selection of a gear, signals proportional to the speed of the vehicle, accelerator position, etc.) and drives the first and the second actuating groups for the selection and the engagement of the gears.

In the automated transmission groups of known type, however, a data exchange is not established between the central electronic engine-control unit and the gearbox group control circuit, and the point of functioning of the engine (number of revolutions and torque delivered) is not controlled with precision during the gear-change operations carried out by the transmission group. For this reason, the gear change is often effected in non-optimum conditions of point of functioning causing disturbances in the running of the vehicle and wear of the transmission group.

SUMMARY OF THE INVENTION

The aim of the present invention is to produce an engine-control device which can be coupled to an endothermic-engine provided with a central control unit and which is capable of overcoming the disadvantages of the automated transmissions of known type.

This aim is achieved by the present invention in that it relates to an electronic engine-control device of the type described in claim 1.

BRIEF DESCRIPTION OF THE DRAWINGS

The invention will now be illustrated with reference to the attached drawings which represent a preferred non-limiting embodiment in which.

DETAILED DESCRIPTION OF THE INVENTION

Figure 1:
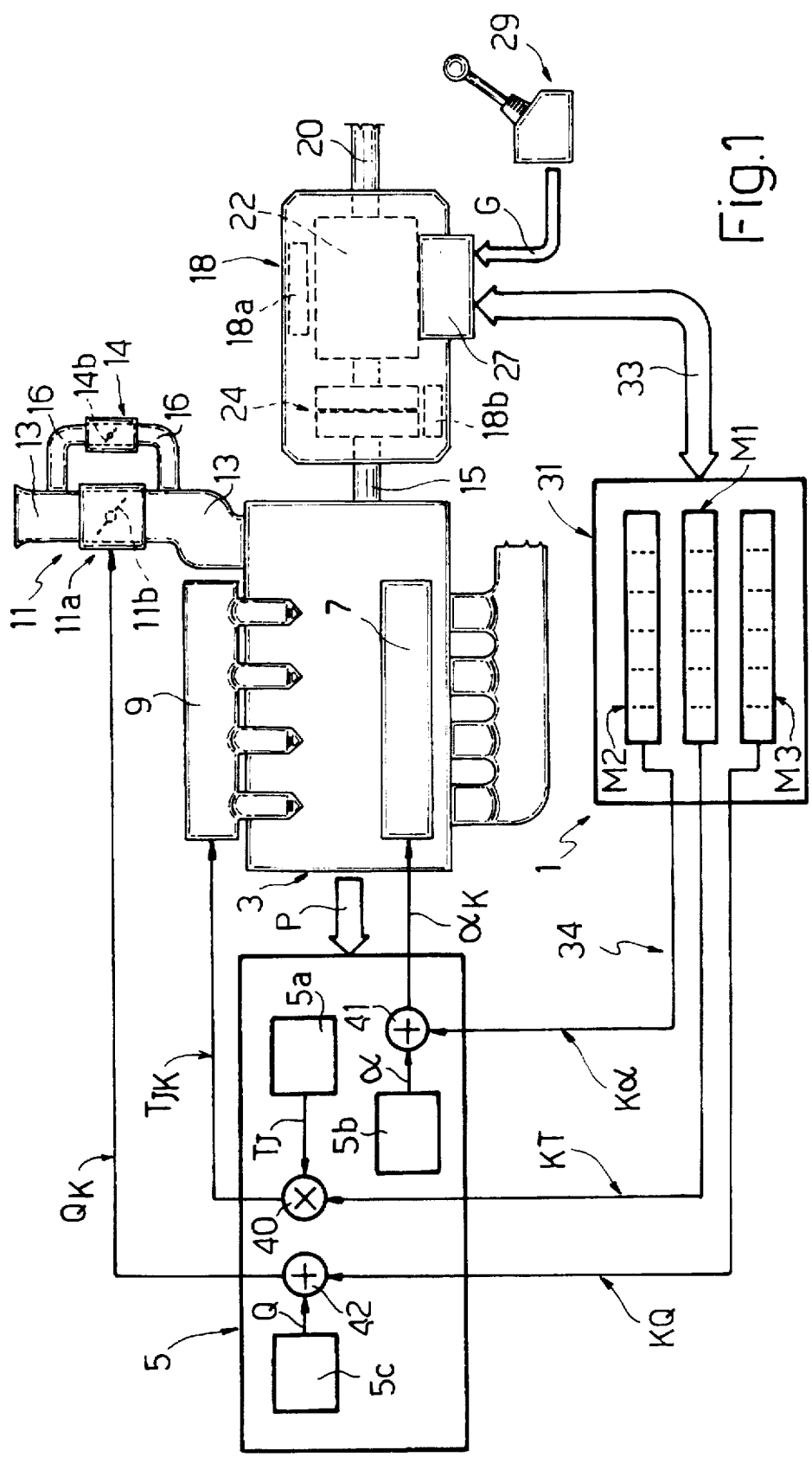
FIG. 1 represents diagrammatically an endothermic engine interacting with an electronic engine-control device made according to the dictates of the present invention.

With particular reference to FIG. 1, 1 indicates, as a whole, an electronic engine-control device interacting with an endothermic engine 3, in particular a petrol engine. The engine 3 interacts with a central electronic engine-control unit 5 which receives in input a plurality of information parameters P measured mainly in the engine 3 and feeds operating signals for an ignition system 7 and an injection system 9 of the engine 3. The central unit 5 also supplies operating signals for a regulator device 11 (represented diagrammatically) which is coupled to the induction manifold 13 of the engine 3 and which is capable of regulating the quantity of air channelled along the manifold towards the combustion chambers (not represented) of the engine 3.

The regulator device 11 (of known type) can comprise an interception valve 11a arranged along the manifold 13 and provided with a mobile portion 11b capable of modifying the through-section of the valve 11 to regulate the quantity of air passing through the valve 11a itself. The mobile portion 11b can be made to move in a direct mechanical manner, for example the portion 11b can be connected by means of a Bowden cable to the accelerator (not represented) of the vehicle, or the mobile portion 11b can be motorized, for example the portion 11b can be actuated by an electric step motor or by an electric linear motor. The regulator device 11 can also comprise an auxiliary valve 14 arranged along a bypass pipe 16 which extends parallel to the manifold 13 and has opposite ends communicating with inlets/outlets of the valve 11a. The auxiliary valve 14 is provided with a mobile element 14b capable of modifying the through-section of the valve 14 to regulate the quantity of air passing through the auxiliary valve 14 itself. The mobile portion 14b can be made to move in a proportional linear manner, or can be mobile between an opening position and a closing position (ON/OFF) of the valve with a drive of mechanical, pneumatic, magnetic type, etc. The auxiliary valve can carry out the function of regulation of the minimum, that is to say allowing an inflow of air towards the combustion chambers with the valve 11 partially or totally closed also, and/or can serve for feeding to the combustion chambers a supplementary quantity of air to increase the performance of the engine.

The central electronic engine-control unit 5 is provided with at least one calculation circuit 5a capable of calculating (for example by means of electronic tables) on the basis of at least some of said information signals P an injection time Tj for the injection system 9. The central electronic engine-control unit 5 is also provided with a calculation circuit 5b capable of calculating (for example by means of electronic tables) on the basis of at least some of said information signals P an angle of advance α for the ignition system 7. The central electronic engine-control unit 5 is lastly provided with a calculation circuit 5c capable of calculating (for example by means of electronic tables) on the basis of at least some of said information signals P a value Q which represents a quantity of air fed to the engine 3.

The engine 3 has an output shaft 15 capable of supplying mechanical power to the input of a transmission group 18 having an output shaft 20 capable of transmitting mechanical power to the wheels of a motor vehicle (not represented). The transmission group 18 comprises a first actuator group 18a (represented diagrammatically) for operating the selection and the engagement of the gears of a gearbox 22 of the group 18 and a second actuator group 18b (represented diagrammatically) for operating the actuation of a clutch 24 of the group 18. The transmission group 18 interacts with a transmission control circuit 27 capable of processing a plurality of input signals G and of controlling the first and the second actuator group 18a, 18b for the selection and the insertion of the gears. For example, the control circuit 27 can receive input signals originating from a selector device 29 which can be actuated manually and can be used for the selection of the gears.

According to the present invention, the electronic control device 1 comprises an electronic unit 31 which communicates with the transmission control circuit 27 and the central engine-control unit 5 by means of respective data (BUS) lines 33, 34.

Figure 2A:
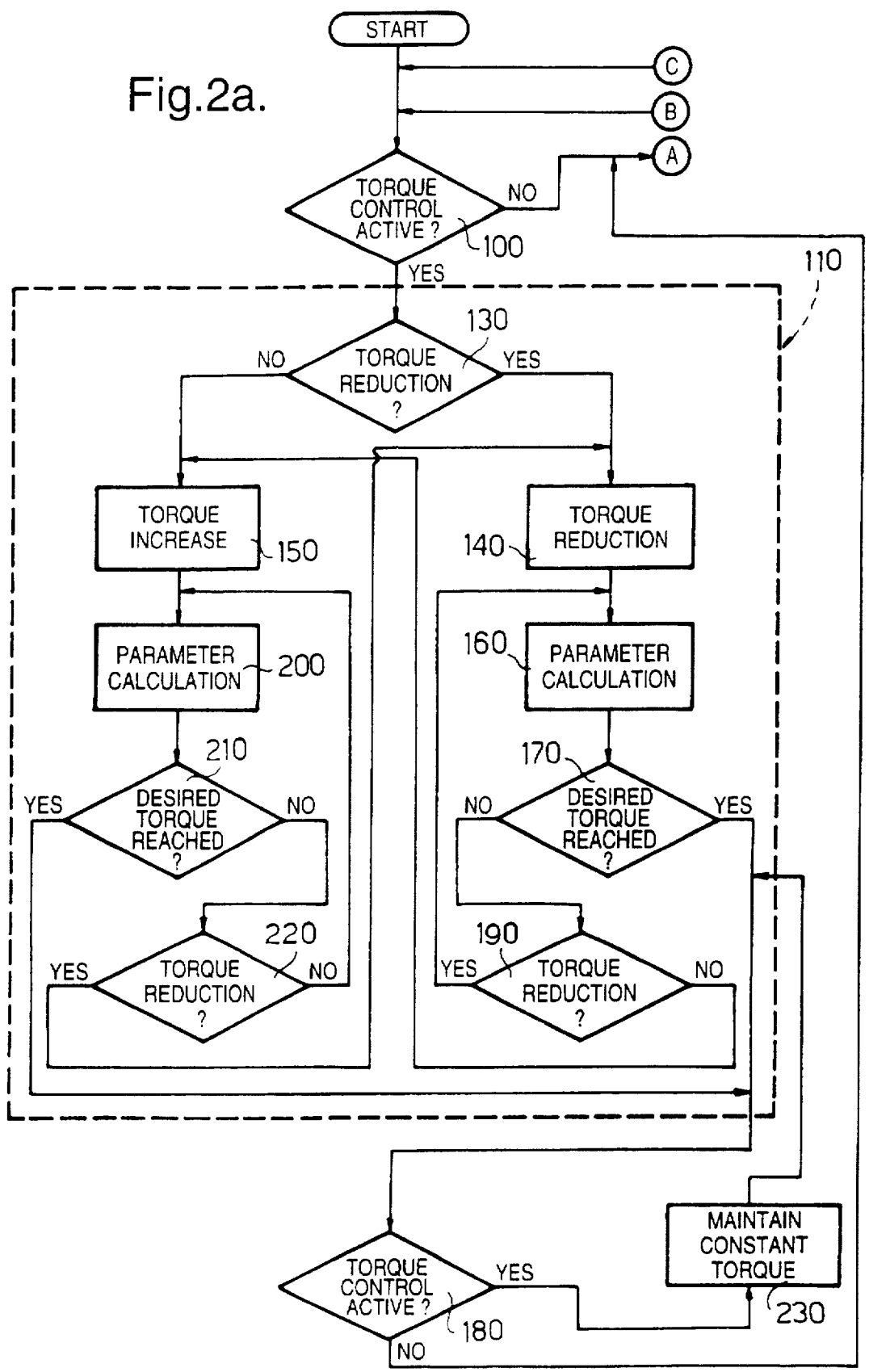
FIGS. 2a and 2b represent block logic diagrams of the functioning of the electronic engine-control device in FIG. 1.
Figure 2B:
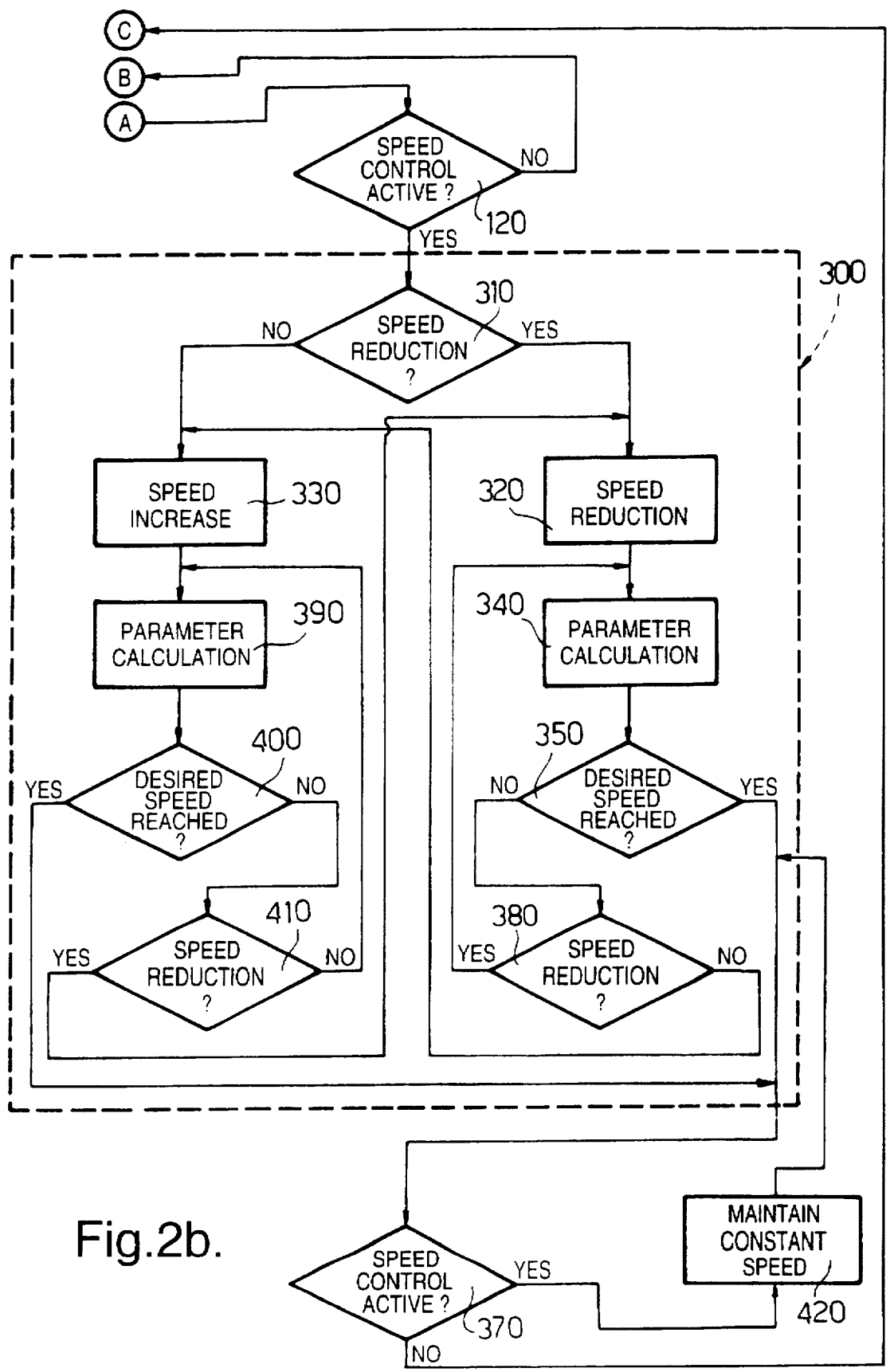

With particular reference to FIGS. 2a and 2b, the functioning of the central unit 1 in the electronic management of the engine 3 will be illustrated. In particular, as will be clarified in the following description, the electronic unit 31 is capable of controlling the torque delivered by the engine 3 and the speed of rotation of the engine 3 on the basis of the requests originating from the transmission control circuit 27.

Initially, a block 100 is reached, in which the device 1 verifies on the basis of an external operating signal, for example originating from the control circuit 27, whether a functioning mode is active according to which the torque generated by the engine 3 is controlled; in the positive case (torque control active), the block 100 is followed by a torque control block 110, otherwise (torque control not active) a block 120, which will be described in detail below, is passed to from block 100. For example, the external operating signal for the torque control can be generated by the circuit 27 corresponding to the opening of the clutch 24.

The torque control block 110 comprises a first block 130 which follows the block 100 and is capable of verifying whether a torque reduction request signal is present. The torque reduction request signal can be generated by the transmission control circuit 27 and is preferably of the bistable type having a first state (for example corresponding to a logical 1) via which a torque reduction is requested by the transmission control circuit 27 and a second state (for example corresponding to a logical 0) via which a torque increase is requested. In a case in which the block 130 detects a torque reduction request, the block 130 is followed by a block, 140, otherwise (torque increase request) the block 130 is followed by a block 150. The block 140 acts to initialize a plurality of parameters of the engine 3 to prepare the engine 3 itself for a torque reduction. In particular, the block 140 acts on the regulator device 11 to permit a rapid torque reduction. For example, the block 140 can operate the closing (or the reduction in through-section) of the auxiliary valve 14 and/or the closing (or the reduction in the through-section) of the valve 11.

The block 140 is followed by a block 160 which calculates, on the basis of predetermined rules, a plurality of parameters to be supplied to the central electronic engine-control unit 5 to modify the injection time Tj, and/or the angle of advance α and/or the quantity Q of air fed to the engine (calculated by the circuits 5a, 5b and 5c) for the purpose of reducing the torque generated by the engine 3.

In particular, the block 160 can calculate a parameter KT which is multiplied (in a node 40 of the central unit 5) with the injection time Tj calculated by the circuit 5a, generating a corrected injection time TJK supplied to the injection system 9. The parameter KT can be calculated by means of a map M1 (illustrated in FIG. 1) which is addressed by means of at least one input parameter representative of the engine 3 phase and supplies in output, for each value of the engine phase, a value of the parameter KT.

Furthermore, the block 160 can calculate a parameter Kα which is added (in a node 41 of the central unit 5) to the angle of advance α calculated by the circuit 5b, generating a corrected angle of advance αK supplied to the ignition system 7. The parameter Kα can be calculated by means of a map M2 (illustrated in FIG. 1) which is addressed by means of at least one input parameter representative of the engine 3 phase and supplies in output, for each value of the engine phase, a value of the parameter Kα.

Finally, the block 160 can calculate a parameter KQ which is added (in a node 42 of the central unit 5) to the quantity of air Q calculated by the circuit 5c, generating a corrected quantity of air QK supplied to the regulator device 11. The parameter KQ can be calculated by means of a map M3 (illustrated in FIG. 1) which is addressed by at least one input parameter representative of the engine 3 phase and supplies in output, for each value of the engine phase, a value of the parameter KQ.

The block 160 is followed by a block 170 which measures the torque currently supplied by the engine 3, verifying whether a predetermined torque value has been reached; in a case of positive verification, block 170 is followed by a block 180 outside the block 110, otherwise (failure to reach predetermined torque value) the block 170 is followed by a block 190. The predetermined torque value can be supplied to the unit 31 by the transmission control circuit 27 or can be stored in a memory (not represented) of the unit 31 itself. The block 190 verifies whether a torque reduction request is present similarly to block 130 on the basis of a request of the transmission control circuit 27. In a case in which the block 190 detects a torque reduction request still present, the block 160 is returned to from the block 190 to calculate and operate this torque reduction, otherwise the block 190 is followed by the block 150. The block 150 acts to initialize a plurality of parameters of the engine 3 to prepare the engine 3 itself for an increase in torque generated. In particular, the block 150 acts on the regulator device 11 to permit a rapid increase in torque. For example, the block 150 can operate the opening (or the increase in through-section) of the auxiliary valve 14 and/or the increase in the through-section of the valve 11.

The block 150 is followed by a block 200 which calculates, on the basis of predetermined rules, a plurality of parameters to be supplied to the central electronic engine-control unit 5 to modify the injection time Tj, and/or the angle of advance α and/or the quantity Q of air fed to the engine for the purpose of increasing the torque generated. In particular, similarly to the block 160, the block 200 can calculate a parameter KT which is multiplied (in the node 40) with the injection time Tj calculated by the circuit 5a, generating a corrected injection time TJK supplied to the injection system 9. Furthermore, the block 200 can calculate a parameter Kα which is added (in the node 41) to the angle of advance α calculated by the circuit 5b, generating a corrected angle of advance αK supplied to the ignition system 9. Finally, the block 200 can calculate a parameter KQ which is added (in the node 42) to the quantity of air Q calculated by the circuit 5c, generating a corrected quantity of air QK supplied to the regulator device 11.

The block 200 is followed by a block 210 which measures the torque currently supplied by the engine 3, verifying whether a predetermined torque value has been reached; in a case of positive verification, block 210 is followed by the block 180, otherwise the block 210 is followed by a block 220. The predetermined torque value can be supplied to the unit 31 by the transmission control circuit 27 or can be stored in a memory (not represented) of the unit 31 itself. The block 220 verifies whether a torque reduction request is present similarly to block 130 on the basis of a request of the transmission control circuit 27. In a case in which the block 220 detects a torque reduction request, the block 140 is returned to from the block 220, otherwise (torque increase request still present) the block 200 is returned to from the block 220.

The block 180 verifies, similarly to the block 100, by means of an external operating signal originating from the circuit 27, whether the torque control is still active; in a positive case (torque control still active) the block 180 is followed by a block 230, otherwise (torque control not active) the block 120 is passed to from the block 180. The block 230 is capable of maintaining the torque generated by the engine 3 at the value currently set at the moment of selection of the block 230 itself, maintaining the injection time, quantity of air fed and the angle of advance as set.

The block 120 verifies, on the basis of external operating signals, for example originating from the circuit 27, whether a functioning mode is active according to which the speed of rotation of the engine 3 is controlled; in the positive case (speed control active), the block 120 is followed by a speed control block 300, otherwise (speed control not active) the block 100 is returned to from the block 120. The speed control block 300 comprises a first block 310 which follows the block 120 and is capable of verifying whether a speed reduction request signal is present. The speed reduction request signal can be generated by the transmission control circuit 27 and is preferably of the bistable type having a first state (for example corresponding to a logical 1) via which a speed reduction is requested by the transmission control circuit 27 and a second state (for example corresponding to a logical 0) via which a speed increase is requested. In a case in which the block 310 detects a speed reduction request, the block 310 is followed by a block 320, otherwise (speed increase request) the block 310 is followed by a block 330. The block 320 acts to initialize a plurality of parameters of the engine 3 to prepare the engine 3 itself for a speed reduction. In particular, the block 320 acts on the regulator device 11 to permit a rapid speed reduction. For example, the block 320 can operate the closing (or the reduction in through-section) of the auxiliary valve 14 and/or the closing (or the reduction in through-section) of the valve 11.

The block 320 is followed by a block 340 which calculates, on the basis of predetermined rules, a plurality of parameters to be supplied to the central electronic engine-control unit 5 to modify the injection time Tj, and/or the angle of advance α and/or the quantity Q of air fed to the engine (calculated by the circuits 5a, 5b and 5c) for the purpose of reducing the speed of rotation of the engine 3. In particular, similarly to the blocks 160 and 200, the block 340 can calculate a parameter KT which is multiplied (in the node 40) with the injection time Tj calculated by the circuit 5a, generating a corrected injection time TJK supplied to the injection system 9. Furthermore, the block 340 can calculate a parameter Kα which is added (in the node 41) to the angle of advance α calculated by the circuit 5b, generating a corrected angle of advance αK supplied to the ignition system 9. Finally, the block 340 can calculate a parameter KQ which is added (in the node 42) to the quantity of air Q calculated by the circuit 5c, generating a corrected quantity of air QK supplied to the regulator device 11.

The block 340 is followed by a block 350 which measures the speed of rotation of the engine 3, verifying whether a predetermined speed value has been reached; in a case of positive verification, block 350 is followed by a block 370 outside the block 300, otherwise the block 350 is followed by a block 380. The predetermined speed value can be supplied to the unit 31 by the transmission control circuit 27 or can be stored in a memory (not represented) of the unit 31 itself. The block 380 verifies whether a speed reduction request is present similarly to block 310 on the basis of a request of the transmission control circuit 27. In a case in which the block 380 detects a speed reduction request still present, the block 340 is returned to from the block 380 to calculate and operate this speed reduction, otherwise the block 380 is followed by the block 330. The block 330 acts to initialize a plurality of parameters of the engine 3 to prepare the engine 3 itself for an increase in the speed of rotation of the engine. In particular, the block 330 acts on the regulator device 11 to permit a rapid increase in speed. For example, the block 330 can operate the opening (or the increase in through-section) of the auxiliary valve 14 and/or the opening (or the increase in through-section) of the valve 11.

The block 330 is followed by a block 390 which calculates, on the basis of predetermined rules, a plurality of parameters to be supplied to the central electronic engine-control unit 5 to modify the injection time Tj, and/or the angle of advance α and/or the quantity Q of air fed to the engine for the purpose of increasing the torque generated. In particular, similarly to the block 340, the block 390 can calculate the parameters KT, Kα and KQ described previously and can use such parameters for the correction of the injection time, the angle of advance and the quantity of air fed to the engine calculated by the circuits 5a, 5b and 5c.

The block 390 is followed by a block 400 which measures the current speed of rotation of the engine 3, verifying whether a predetermined speed value has been reached; in a case of positive verification, block 400 is followed by a block 370, otherwise the block 400 is followed by a block 410. The predetermined speed value can be supplied to the unit 31 by the transmission control circuit 27 or can be stored in a memory (not represented) of the unit 31 itself. The block 410 verifies whether a speed reduction request is present similarly to block 310 on the basis of a request of the transmission control circuit 27. In a case in which the block 410 detects a speed reduction request, the block 320 is returned to from the block 410, otherwise (speed increase request still present) the block 400 is returned to from the block 410.

The block 370 verifies, similarly to the block 120, by means of analysis of an external operating signal, for example originating from the operating circuit 27, whether the speed control is still active; in a positive case (speed control still active) the block 370 is followed by a block 420, otherwise (speed control not active) the block 100 is returned to from the block 370. The block 420 is capable of maintaining the speed of rotation of the engine equal to the value currently set. The speed of rotation of the engine is maintained essentially constant, or in any case maintained fluctuating around an average value within a regulation band, by acting on the injection time, in particular by alternating periods in which fuel is injected into the engine with periods in which the injection is cut off.

In use, on the ignition of the system 1, the electronic unit 31 communicates with the central electronic engine-control unit 5 and with the transmission operating circuit 27.

Following the receipt of an operating signal (block 100) for torque control originating from the circuit 27, the device 1 carries out a phase (block 110) during which the torque delivered by the engine is regulated. In particular, at the start of this torque regulation phase (110), it is verified whether the circuit 27 requires a reduction or an increase in the torque delivered (block 130). In a case of a request for torque reduction being present, a series of operations (blocks 140 and 160) is carried out for the purpose of reducing the value of the torque delivered towards a target torque value. At the end of these operations, it is verified whether the value of the torque delivered has been modified correctly and whether this target torque value has been reached (block 170); in a case of failure to reach (block 170) the target torque value, the operations (block 160) capable of reducing the value of torque delivered by the engine are repeated.

In a case of a request for torque increase, a series of operations (blocks 150 and 200) is carried out for the purpose of increasing the value of the torque delivered towards a target torque value. At the end of these operations, it is verified whether the value of the torque delivered has been modified correctly and whether this target torque value has been reached (block 210); in a case of failure to reach (block 210) the target torque value, the operations (block 200) capable of increasing the value of torque delivered by the engine are repeated.

In a case in which the target torque has not been reached and the circuit 27 requests a variation of the torque (increase or reduction) different from that set (blocks 190, 220), this request is actuated immediately (passage to the blocks 200, 160).

At the end of the operations with which the value of torque delivered by the engine has been modified (increased or reduced), the device 1 verifies (block 180) whether the circuit 27 is requesting further torque control; in the affirmative case, the torque delivered by the engine is maintained equal to the value previously reached (block 230), otherwise the device 1 prepares for the activation (block 120) of a speed control. In particular, the speed control phase is activated following an external command (block 120) originating from the circuit 27. At the start of the speed control phase, it is verified whether the circuit 27 is requesting a reduction or an increase in the speed of rotation (block 310). In a case of a request for a reduction in speed, a series of operations (blocks 320 and 340) is carried out for the purpose of reducing the value of the speed towards a target speed value. At the end of these operations, it is verified whether the value of the target speed of rotation has been reached (block 350); in a case of failure to reach (block 350) the target speed value, the operations (block 340) capable of reducing the speed of rotation of the engine are repeated.

In a case of a request for speed increase, a series of operations (blocks 330 and 390) is carried out for the purpose of increasing the speed of rotation of the engine towards a target speed value. At the end of these operations, it is verified whether the value of the target speed of rotation has been reached (block 400); in a case of failure to reach (block 400) the target speed value, the operations (block 390) capable of increasing the speed of rotation of the engine are repeated.

In a case in which the target speed has not been reached and the circuit 27 requests a variation of the speed (increase or reduction) different from that set (blocks 380, 410), this request is actuated immediately (passage to the blocks 390, 340). At the end of the operations with which the speed of rotation of the engine has been modified (increased or reduced), the device 1 verifies (block 370) whether the circuit 27 is requesting further speed control; in the affirmative case, the speed is maintained equal to that set (block 420), otherwise the torque control is made available again (block 100).

From the above, the advantages of the present invention are clear, as the device 1 carries out in a sequential manner control of the torque and of the speed of rotation of the engine for the purpose of satisfying the requests of the transmission group control circuit 27. The device 1 "talks" with the central engine-control unit 5 and the transmission control circuit 27, receiving from the latter the requests for modifying the torque delivered by the engine and the speed of rotation of the engine corresponding to a gear change.

These requests are analysed in a complete manner (see FIGS. 2a, 2b and relevant discussion) and correction parameters are generated in response which modify the operating signals of the engine produced by the central unit 5. The engine control of the present invention is therefore superimposed on the normal enmgine control carried out by the central unit 5, completing it. The engine control of the present invention therefore permits optimum control of the point of functioning of the engine (number of revolutions and torque delivered) during the gear-change which is therefore effected in optimum conditions of point of functioning of the engine. The device 1 therefore makes it possible to optimize the overall performance of the vehicle (running comfort, safety) and to avoid wear of the transmission group.

It is clear lastly that modifications and variations can be carried out on the electronic engine-control device described without moreover leaving the protective scope of the present invention.

We claim:

1. An electronic engine-control device for an endothermic engine (3) coupled to a transmission group (18) capable of receiving the mechanical power generated by the engine (3), said transmission group (18) comprising at least one clutch (24) and at least one gearbox (22) which are mobile under the thrust of actuator means (18a, 18b), said transmission group (18) being coupled to a circuit (27) for control of said actuator means (18a, 18b) which is capable of receiving remote signals (29) for carrying out a gear change, said endothermic engine (3) interacting with control means (5) receiving at an input a plurality of information parameters (P) measured at least partially in said engine (3) and generating at an output control signals (Tj, α, Q) for operating units (7, 9, 11) of said engine (3), said engine-control device comprising:

processing means (31) communicating (33, 34) with said control circuit (27) of said transmission group and with said means of control (5) of said engine (3);

said processing means (31) comprising first means of activation (100) capable of selecting, following a first selection command originating from said control circuit (27), first calculation means (110) capable of modifying said control signals (Tj, α, Q) to regulate the torque generated by said engine (3);

said processing means (31) also comprising second means of activation (120) which can be activated alternately with said first means of activation (100) and is capable of selecting, following a second selection command originating from said control circuit (27), second calculation means (300) capable of modifying said control signals (Tj, α, Q) to regulate the speed of rotation of said engine (3);

said first calculation means (110) comprising first decision means (130) capable of detecting a torque modification request originating from said control circuit (27), said first decision means (130) being capable of selecting first regulation means (140, 160) following a torque reduction request originating from said control circuit (27) and being capable of selecting second regulation means (150, 200) following a torque increase request originating from said control circuit (27), said first regulation means (140, 160) being capable of calculating correction parameters (KT, Kα, KQ) applied to said control signals (TJ, α, Q) for the calculation of corrected control signals (TK, αK, QK) fed to said operating units, said second regulation means (150, 200) being capable of calculating correction parameters (KT, Kα, KQ) applied to said control signals (Tj, α, Q) for the calculation of corrected control signals (TK, αK, QK) fed to said operating units.

2. Device according to claim 1, wherein said operating units comprise at lest one injection system (9) coupled to said engine (3) and said control means (5) comprises a calculation circuit (5a) receiving at an input at least some of said information parameters (P) and generating at an output an injection time (Tj), said first and second regulation means (160, 200) being capable of calculating a correction parameter (KT) for said injection time (Tj) to calculate a corrected injection time (TJK) fed to said injection system (9).

3. Device according to claim 2, wherein said first and second regulation means (160, 200) comprise at least one first map (M1) which can be addressed by means of at least one input parameter representative of the engine (3) phase and which generates at an output, for each engine phase, a value of said correction parameter of said injection time (KT).

4. Device according to claim 1, wherein said operating units comprise at least one ignition system (7) coupled to said engine (3) and wherein said control means (5) comprises a calculation circuit (5b) receiving at an input at least some of said information parameters (P) and generating at an output an angle of advance (α), said first and second regulation means (160, 200) being capable of calculating a correction parameter (Kα) for said angle of advance (α) to calculate a corrected angle of advance (TJK) fed to said ignition system (7).

5. Device according to claim 4, wherein said first and second regulation means (160, 200) comprise at least one second map (M2) which can be addressed by means of at least one input parameter representative of the engine (3) phase and which generates at an output, for each value of the engine phase, a value of said correction parameter (Kα) of said angle of advance (α).

6. Device according to claim 1, wherein said operating units comprise at least one system (11) for the regulation of the quantity of air fed to said engine (3) and wherein said control means (5) comprises a calculation circuit (5c) receiving at an input at least some of said information parameters (P) and generating at an output at least one value representative of said quantity of air (Q), said first and second regulation means (160, 200) being capable of calculating a correction parameter (KQ) for said value representative of quantity of air (Q) to calculate a corrected value representative of said quantity of air (Q) fed by said system (11).

7. Device according to claim 6, wherein said first and second regulation means (160, 200) comprise at least one third map (M3) which can be addressed by means of at least one input parameter representative of the engine (3) phase and which generates at an output, for each value of the engine phase, a value of said correction parameter (KQ) for said value representative of said quantity of air (Q).

8. Device according to claim 1, comprising first verification means (170) which can be activated following said first regulation means (140, 160) and is capable of monitoring the torque delivered by said engine (3) to verify reaching a first target torque value, said first verification means (170) being capable of reselecting said first regulation means (160) following a failure to reach said first target torque value, said first verification means also being capable of selecting third activation means (180) on reaching said first target torque value.

9. Device according to claim 8, comprising first confirmation means (190) which can be selected by said first verification means (170) in the event of failure to reach said first target torque value, said first confirmation means (190) being capable of reselecting said first regulation means (160) in the presence of said torque reduction request and being capable of selecting said second regulation means (200) in the presence of said torque increase request.

10. Device according to claim 8, wherein said third activation means (180) is capable of detecting at least the first selection command originating from said control circuit (27), said third activation means (180) being capable of selecting means of maintaining torque (230) in the presence of said first selection command and being capable of selecting second activation means (120) otherwise, said means of maintaining torque (230) being capable of controlling said operating units to maintain the torque essentially equal to the value present on the selection of the means of maintaining torque (230) themselves.

11. Device according to claim 1 comprising second verification means (210) which can be activated following said second regulation means (150, 200) and is capable of monitoring the torque delivered by said engine to verify reaching a second target torque value, said second verification means (210) being capable of reselecting said second regulation means (200) following a failure to reach said second target torque value, said second verification means (210) also being capable of selecting third activation means (180) on reaching said second target torque value.

12. Device according to claim 11, comprising second confirmation means (220) which can be selected by said second verification means (210) in the event of failure to reach said second target torque value, said second confirmation means (220) being capable of reselecting said second-regulation means (200) in the presence of said torque increase request and being capable of selecting said first regulation means (160) in the presence of said torque reduction request.

13. Device according to claim 1, wherein said second calculation means (300) comprises second decision means (310) capable of detecting an engine speed modification request originating from said control circuit (27), said second decision means (310) being capable of selecting third regulation means (320, 340) following a speed reduction request originating from said control circuit (27) and being capable of selecting fourth regulation means (330, 390) following a speed increase request originating from said control circuit (27), said third regulation means (320, 340) being capable of calculating correction parameters (KT, Kα, QK) applied to said control signals (Tj, α, Q) for the calculation of corrected control signals (TK, αK, QK) fed to said operating units, said fourth regulation means (330, 390) being capable of calculating correction parameters (KT, Kα, KQ) applied to said control signals (Tj, α, Q) for the calculation of corrected control signals (TK, αK, QK) fed to said operating units.

14. Device according to claim 13, wherein said operating units comprise at least one injection system (9) coupled to said engine (3) and in that said control means (5) comprise a calculation circuit (5a) receiving at an input at least some of said information parameters (P) and generating at an output an injection time (Tj), said third and fourth regulation means (340, 390) being capable of calculating a multiplicative (40) correction parameter (KT) for said injection time (Tj) to calculate a corrected injection time (TJK) fed to said injection system (9).

15. Device according to claim 13, wherein said operating units comprise at least one ignition system (7) coupled to said engine (3) and in that said control means (5) comprise a calculation circuit (5b) receiving at an input at least some of said information parameters (P) and generating at an output an angle of advance (α), said third and fourth regulation means (340, 390) being capable of calculating an additive (41) correction parameter (Kα) for said angle of advance (α) to calculate a corrected angle of advance (TJK) fed to said ignition system (7).

16. Device according to claim 13, wherein said operating units comprise at least one system (11) for the regulation of the quantity of air fed to said engine (3) and in that said control means (5) comprises a calculation circuit (5c) receiving at an input at least some of said information parameters (P) and generating at an output at least one value representative of said quantity of air (Q), said third and fourth regulation means (340, 390) being capable of calculating a correction parameter (KQ) for said value representative of said quantity of air (Q) to calculate a corrected value representative of said quantity of air (Q) fed to said system (11).

17. Device according to claim 13, comprising third verification means (350) which can be activated following said third regulation means (320, 340) and are capable of monitoring the speed of rotation of said engine (3) to verify the reaching of a first target speed value, said third verification means (350) being capable of reselecting said third regulation means (340) following a failure to reach said first target speed value, said third verification means (350) also being capable of selecting fourth activation means (370) on reaching said first target speed value.

18. Device according to claim 17, comprising third confirmation means (380) which can be selected by said third verification means (350) in the event of failure to reach said first target speed value, said third confirmation means (380) being capable of reselecting said third regulation means (340) in the presence of said speed reduction request and being capable of selecting said fourth regulation means (390) in the presence of said speed increase request.

19. Device according to claim 17, wherein said fourth activation means (370) is capable of detecting at least the second selection command originating from said control circuit (27), said fourth activation means (370) being capable of selecting means of maintaining speed (420) in the presence of said second selection command and being capable of selecting said first activation means (100) otherwise, said means of maintaining speed (420) being capable of controlling said operating units to maintain the speed of rotation of the engine essentially equal to the value present on the selection of the means of maintaining speed (420) themselves.

20. Device according to claim 13, comprising fourth verification means (400) which can be activated following said fourth regulation means (330, 390) and is capable of monitoring the speed of rotation of said engine to verify the reaching of a second target speed value, said fourth verification means (400) being capable of reselecting said fourth regulation means (390) following a failure to reach said second target speed value, said fourth verification means (400) also being capable of selecting fourth activation means (370) on reaching said second target speed value.

21. Device according to claim 20, comprising fourth confirmation means (410) which can be selected by said fourth verification means (400) in the event of failure to reach said second target speed value, said fourth confirmation means (400) being capable of reselecting said fourth regulation means (390) in the presence of said speed increase request and being capable of selecting said third regulation means (340) in the presence of said speed reduction request.

22. Engine-control device according to claim 1, wherein said engine comprises flow controller means (11) capable of varying the quantity of air channelled towards the combustion chambers of said engine (3), and wherein said first calculation means (110) and said second calculation means (300) are capable of generating control signals for said flow controller means (11) in response to operating signals originating from said control circuit (27) of said transmission group (18).

23. Engine-control device according to claim 22, wherein said flow controller means comprises first interception means (11) interposed along an induction manifold (13) of said engine, and wherein said first calculation means (110) and said second calculation means (300) are capable of generating control signals for said interception means (11) to regulate the quantity of air passing through the first interception means (11).

24. Engine control device according to claim 23, wherein said flow controller means comprises auxiliary interception means (14) interposed along a bypass pipe (16) extending parallel to said induction manifold (13), and wherein said first calculation means (110) and said second calculation means (300) are capable of generating control signals for said auxiliary interception means (14) to regulate the quantity of air passing through the auxiliary interception means (14).

25. Engine-control device according to claim 1, wherein said processing means (31) is external to said control means of said engine (3).

* * * * *